Figure 1:
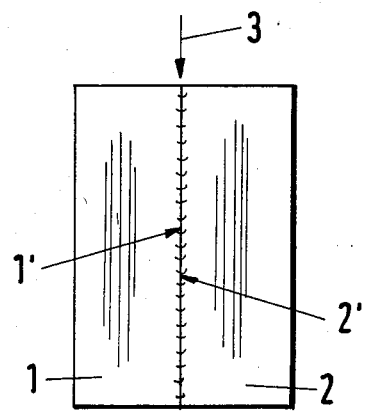

United States Patent [19]

Sturm

[11] Patent Number: 4,733,815

[45] Date of Patent: Mar. 29, 1988

[54] PROCESS FOR GUIDING SHEETS TO BE BUTT-WELDED TOGETHER AND APPARATUS WITH MEANS FOR CONVEYING AND GUIDING SHEETS OR STRIPS TO BE BUTT-WELDED TOGETHER

[75] Inventor: Joseph Sturm, Duisburg, Fed. Rep. of Germany

[73] Assignee: Thyssen Stahl AG, Duisburg, Fed. Rep. of Germany

[21] Appl. No.: 16,598

[22] Filed: Feb. 19, 1987

[30] Foreign Application Priority Data

Feb. 25, 1986 [DE] Fed. Rep. of Germany ....... 3605946

[51] Int. Cl.$^4$ ...................... B23K 26/08; B23K 37/00
[52] U.S. Cl. .................... 228/4.1; 228/44.3; 228/47; 219/61.13; 219/102; 219/121 LC
[58] Field of Search ............ 228/49.4, 4.1, 44.3, 228/47, 243, 235; 219/102, 61.13, 121 LC

[56] References Cited

U.S. PATENT DOCUMENTS

| | | | |
|---|---|---|---|
| Re. 26,726 | 12/1969 | Briggs, III | 219/102 |
| 2,147,868 | 2/1939 | Von Henke | 219/102 |
| 3,517,158 | 6/1970 | Briggs, III | 219/102 |
| 4,272,004 | 6/1981 | Nilsen | 228/17.5 |
| 4,634,038 | 1/1987 | Luigi | 228/17.5 |

Primary Examiner—Nicholas P. Godici
Assistant Examiner—Samuel M. Heinrich
Attorney, Agent, or Firm—Sprung Horn Kramer & Woods

[57] ABSTRACT

The invention relates to a process for guiding sheets or strips to be butt-welded together and to an apparatus with means for conveying and guiding sheets or strips to be butt-welded together. The sheets or strips, lying laterally next to one another, each with one of its side edges against a guide surface lying in the same vertical plane, are brought into contact without gaps in the same horizontal plane, on conveying planes inclined at an acute angle relative to one another. In the apparatus, the conveying means, especially roller tables, form conveying planes arranged at an acute angle α relative to one another. The guide means consist of guide surfaces lying in the same vertical plane. Thus, strips or sheets can be guided continuously past a fixed welding device in order to be welded together without gaps.

8 Claims, 13 Drawing Figures

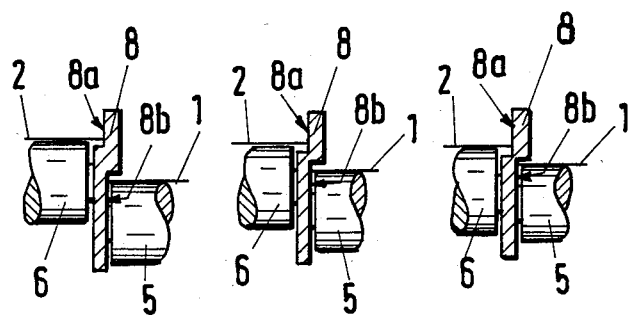
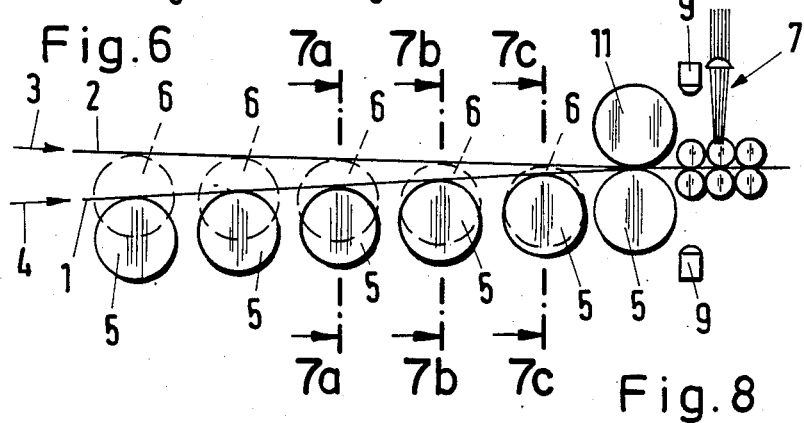
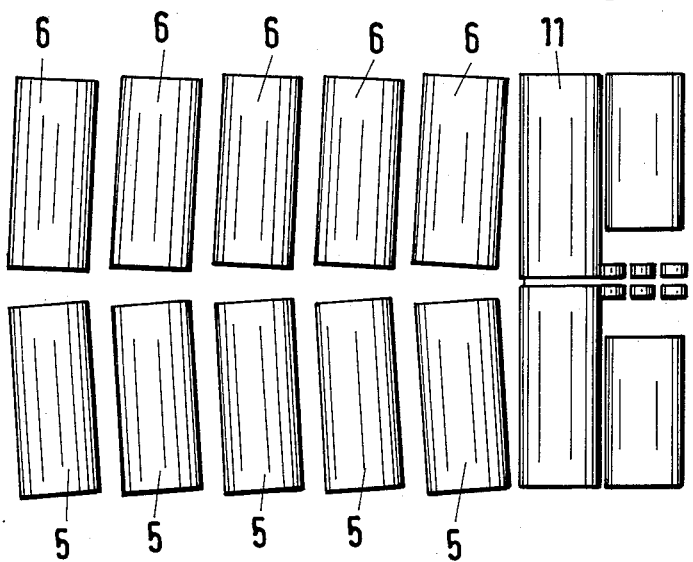

PROCESS FOR GUIDING SHEETS TO BE BUTT-WELDED TOGETHER AND APPARATUS WITH MEANS FOR CONVEYING AND GUIDING SHEETS OR STRIPS TO BE BUTT-WELDED TOGETHER

The invention relates to a process for guiding sheets or strips to be butt-welded together and to an apparatus with means for conveying and guiding these sheets or strips.

For the longitudinal seam-welding of sheets or strips, the sheets or strips to be welded together must be guided so that their edges rest against one another without gaps, to ensure that they can be welded together without difficulty. To weld sheets together, it is known that the sheets can be laid against one another, clamped and that, during welding, a welding device can be moved along the edges to be welded together. Where flexible sheets are concerned, it is difficult to lay the edges to be welded together against one another without gaps and clamp them in this position. At the same time, there is also the disadvantage that the sheets unintentionally overlap. Continuous operation regardless of the sheet thickness is not possible. A further disadvantage of the known procedure is that both the sheets or strips and the welding device have to be moved. It is not possible to transport the sheets or strips continuously through the welding installation. At the same time, it is likewise impossible for the welding device to operate continuously, and the length of the welding seam is limited by the travel path of the welding device.

Particularly with regard to welding devices having a fixed welding head past which the butt edges to be welded together have to be guided, at the same time resting against one another without gaps, the known processes and apparatuses cannot be used.

The object on which the invention is based is to provide a process and an apparatus for guiding sheets or strips to be butt-welded together, which are suitable for guiding strios or sheets continuously past a fixed welding device.

In the process according to the invention, this object is achieved because the sheets or strips, lying laterally next to one another each with one of its side edges against a guide surface lying in the same vertical plane, are brought into contact without gaps with one another in the same horizontal plane, on conveying planes inclined at an acute angle α. In the process according to the invention, the edges to be welded together rest against one another without gaps. The sheets or strips can no longer overlap and continuous operation is possible, this being especially important for the processing of strips.

The apparatus according to the invention achieves the object because the conveying means, especially roller tables, form conveying planes arranged at an acute angle relative to one another, and because the guide means consist of guide surfaces lying in the same vertical plane. The welding device can therefore be arranged in a stationary manner. The transport of the sheets or strips is not interrupted as a result of processing in the welding installation. The length of the welding seam is unlimited. The welding device can operate either continuously or intermittently. Both single sheets and strips can be processed. Since the guides are arranged at different heights, there is not only sufficient space for each guide, but there is also room for accessories possibly arranged on it. Because the edges to be welded together rest against one another exactly, the error rate during welding is reduced.

In order accurately to guide the edges to be brought up against one another, it is advantageous to provide in the apparatus lateral guide means for the edges to be welded together. Advantageously, these guide means are designed as straightedges or rollers. It is even more advantageous if the lateral guide means are conveying rollers inclined towards the centre axis of the apparatus. These conveying rollers serve at the same time as guide means.

To avoid impeding the transport of the sheets or strips, it is further proposed that gripping rollers be arranged above and below the strips or sheets, behind the guide as seen in the running direction of the strips or sheets. The gripping rollers need not be driven, but can be free-running rollers.

It is especially advantageous, at the same time, to use two pairs of gripping rollers which are arranged in succession in the running direction and between which a welding device can be arranged. Consequently, even when sheets are welded together, it is not necessary to provide a continuous welding seam. On the contrary, the sheets need only be spot-welded at their edges, without the relative position of one sheet in relation to the other changing shortly before welding, for example as a result of slipping.

Monitoring devices which check on the one hand the distance between the edges to be welded together and on the other hand the finished welding seam can be arranged between the pairs of gripping rollers.

Figure 2:
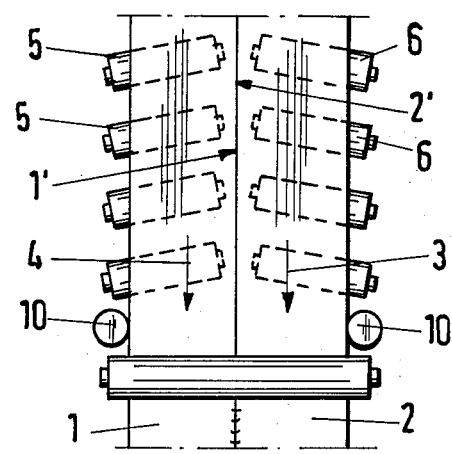
Figure 3:
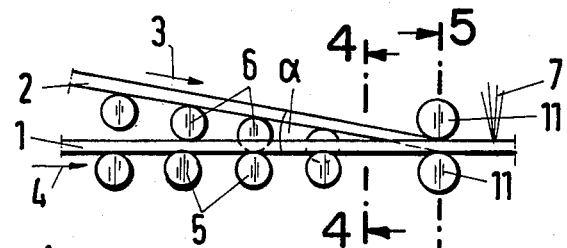
Figure 4:
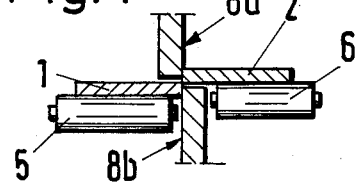
Figure 5:
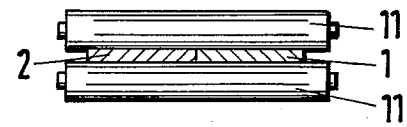
Figure 10:
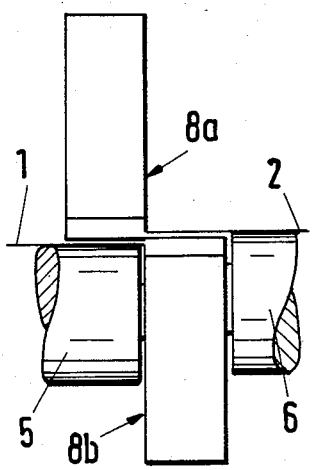
Figure 9:
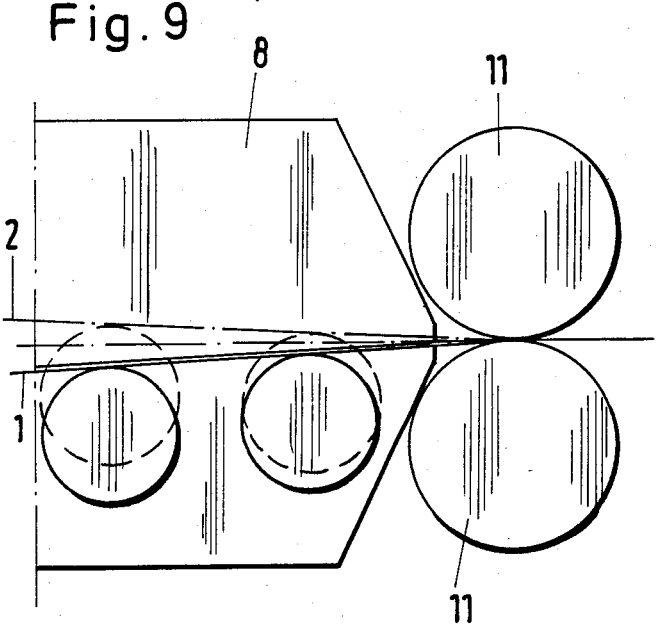
Figure 11:
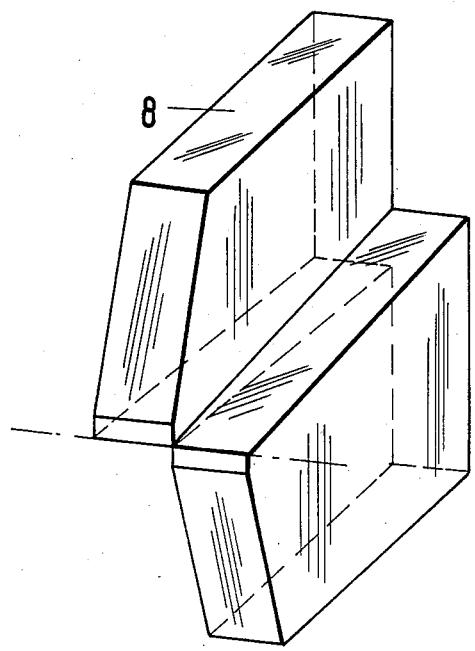

An exemplary embodiment of the invention is illustrated in the drawings and described in detail below. In the drawings:

FIG. 1 shows a plan view of two sheets welded together by means of a longitudinal seam, FIG. 2 shows a plan view of two strips which are guided so as to bring their edges to be welded together up against one another, FIG. 3 shows a side view of the arrangement according to FIG. 2, FIG. 4 shows a section along the line A–B of FIG. 3, FIG. 5 shows a section along the line C–D of FIG. 3, FIG. 6 shows a vertical section througn the apparatus, FIG. 7 shows sections along the lines E–F, G–H and I–K of FIG. 6, FIG. 8 shows a plan view of the apparatus according to FIG. 6, FIG. 9 shows a cut-out from FIG. 6 in the region of the gripping rollers, FIG. 10 shows a plan view of the arrangement according to FIG. 9 in the opposite direction to the conveying direction of the strips, FIG. 11 shows a perspective view of the apparatus.

FIG. 1 shows a plan view of two sheets 1, 2 which are welded at their edges 1', 2' by means of a longitudinal seam.

FIG. 2 illustrates how the two sheets 1, 2 are delivered in order to bring the edges to be welded together up against one another. The two sheets or strips move towards one another at an acute angle α, until their edges 1', 2', to be welded together, butt against one another. The direction of movement of the sheets or strips is represented by arrows 3 and 4. Once the edges butt against one another, the sheets 1, 2 are guided by lateral rollers 10, so that the edges 1', 2' rest against one another without gaps but do not overlap. The sheets or strips are conveyed in the direction of the arrows 3, 4 by rollers 5, 6, only a few of which are shown here. In order to press the surface 1, 2 by means of its edges 1', 2' against the respective guide surfaces 8a, 8b shown in the further Figures, the rollers 5, 6 are inclined towards the centre axis of the apparatus, so that they exert a force on the sheets not only in the direction of transport, out also in the direction of the centre axis of the apparatus.

As shown in FIG. 3 which is a side view of the arrangement according to FIG. 2, the sheets 1, 2 move towards one another at the acute angle of elevation α. At the location where the two sheets 1, 2 come together at the same height and where the edges 1', 2' to be welded together rest against one another, gripping rollers 11 are provided above and below the sheets. The gripping rollers 11 hold the sheets 1, 2 in the position intended for welding.

A welding device 7 is arranged behind the gripping rollers 11 in the direction of advance. Behind the welding device 7 follow devices, not shown in FIG. 3, for general finishing work, such as welding-seam cleaning devices and devices for monitoring the welding seam, and the discharge roller table. For illustration, FIG. 6, together with the associated sectional drawings in FIG. 7a, 7b and 7c, shows a side view of the apparatus according to the invention in more detail. As shown in FIGS. 2 and 3, the delivery arrangement consists of two conveyor tracks (roller tables) formed from the rollers 5 and 6, with different sheet feed heights. The conveying driven rollers 5, 6 are at an acute angle to one another both laterally and as seen from above. During the forward movement, lateral rollers 10 press the sheets or strips 1, 2 simultaneously against a guide 8 which is arranged between the strips 1, 2 and has guide surfaces 8a, 8b and which lies in the centre axis of the apparatus as a whole. This ensures that the two sheets 1, 2, when they come together at the gripping rollers 11, rest against one another without gaps and at the same height by means of their longitudinal edges. The gripping rollers 11 are as closely adjacent to the guide 8 as possible.

The gripping-roller unit following the guide 8 in the direction of advance consists of a driven pair of gripping rollers 11. This grasps the oncoming sheets and holds them under tension, so that in the welding position, the sheets are in the same arrangement relative to one another. The welding device is here located behind the pair of gripping rollers 11.

The offset welding device can be designed as a laser welding device. It is thus possible to ensure that the laser beam has a fixed ideal short travel free of machine movements and environmental influences from the resonator up to the deflecting mirror of the focusing unit. It is also possible thereby to weld metal sheets intermittently and metal strips continuously from the coil.

Because the roller conveyors converge in the manner of scissors, the length of the sheets to be welded together is not restricted.

The gripping-roller unit provided guarantees that no edge offset of the sheets to be welded together occurs at the welding point. The sag of the welding seam can be influenced by the lower inert-gas supply and fume extraction which are possible in the arrangement.

The lateral guide 8 can be designed as a sliding-stop straightedge, guide fence, pressure roller or other arrangements. In a design as a guide fence or sliding-stop straightedge, the burr on the side edge is smoothed as a result of friction.

I claim:

1. An apparatus for conveying and guiding sheets to be butt-welded comprising conveying means for each of the sheets disposed laterally one beside the other and vertically offset in relation to one another, the conveying means moving the sheets together at an acute angle in the same horizontal plane, the conveying means forming conveying planes which lie at an acute angle relative to one another and which run together in a common horizontal plane upstream of the welding apparatus, and at least one guide means in the exit zone of the conveying planes and extending along the conveying path, the guide means having guide surfaces which lie in the same vertical plane and extend to immediately in front of the welding device and to which the edges of the strips or sheets are guided from opposite sides.

2. An apparatus according to claim 1, including a common guide rail associated with the two conveying planes and disposed between the conveying planes in the central axis of the apparatus.

3. An apparatus according to claim 1, wherein the conveying planes are formed by roller tables having conveying rollers extending over the roller table width.

4. An apparatus according to claim 1, further including lateral guide means for the sheets.

5. An apparatus according to claim 4, wherein the lateral guide means are straight edges or rollers.

6. An apparatus according to claim 1, wherein the conveying means include conveying rollers which are inclined towards the center axis of the apparatus.

7. An apparatus according to claim 1, including gripping rollers arranged above and below the sheets behind the guide as seen in the running direction of the sheets.

8. A welding apparatus comprising a laser welder, means for conveying thereto two sheets to be butt-welded, and a vertical guide, the conveying means comprising two sets of rollers whose axes are at an acute angle to the direction of conveying advance, each roller set defining a plane with the planes of the two sets forming an angle, the apparatus further including means for bringing sheets conveyed in the two planes into a common plane adjacent the welder, the vertical guide being positioned immediately upstream of the welder and including means for bringing the sheets into full lateral contact.

* * * * *